(12) United States Patent
Dunne et al.

(10) Patent No.: US 11,537,272 B2
(45) Date of Patent: Dec. 27, 2022

(54) CONTENT MANAGEMENT SYSTEM EXTENSIONS

(71) Applicant: AON GLOBAL OPERATIONS SE, SINGAPORE BRANCH, Singapore (SG)

(72) Inventors: Anthony Dunne, Dublin (IE); Niall Toal, Mountjoy (IE); Remo Jansen, Dublin (IE)

(73) Assignee: AON GLOBAL OPERATIONS SE, SINGAPORE BRANCH, Singapore (SG)

( * ) Notice: Subject to any disclaimer, the term of this patent is extended or adjusted under 35 U.S.C. 154(b) by 152 days.

(21) Appl. No.: 15/846,496

(22) Filed: Dec. 19, 2017

(65) Prior Publication Data
US 2018/0173390 A1    Jun. 21, 2018

Related U.S. Application Data

(60) Provisional application No. 62/437,571, filed on Dec. 21, 2016, provisional application No. 62/438,709, (Continued)

(51) Int. Cl.
*G06F 9/54* (2006.01)
*G06F 16/958* (2019.01)
(Continued)

(52) U.S. Cl.
CPC .......... *G06F 3/0484* (2013.01); *G06F 3/0481* (2013.01); *G06F 9/547* (2013.01); *G06F 16/958* (2019.01); *G06F 16/9566* (2019.01)

(58) Field of Classification Search
CPC .................................. H04L 67/02; G06F 9/451
See application file for complete search history.

(56) References Cited

U.S. PATENT DOCUMENTS

| 6,938,077 B2 * | 8/2005 | Sanders .............. G06F 16/9577 |
| | | 709/219 |
| 7,350,191 B1 | 3/2008 | Kompella et al. |

(Continued)

FOREIGN PATENT DOCUMENTS

| CN | 110651252 | 1/2020 |
| CN | 110692070 | 1/2020 |

(Continued)

OTHER PUBLICATIONS

International Search Report and Written Opinion issued in International Application No. PCT/SG2017/050633 dated Mar. 6, 2018, 10 pages.

(Continued)

*Primary Examiner* — Benjamin Smith
(74) *Attorney, Agent, or Firm* — Gardella Grace P.A.

(57) ABSTRACT

In an illustrative embodiment, methods and systems for integrating web content generated by a content management system (CMS) with dynamic content generated by a content development system include an API handler of the CMS configured to communicate an action received from a remote computing device to a web part, where the web part interfaces with both the CMS and a web application framework to coordinate response to the action and to inject information regarding the dynamic content into the web content for use by the remote computing device. The remote computing device may include a view provider module configured to access the dynamic content using the injected information.

10 Claims, 11 Drawing Sheets

Related U.S. Application Data filed on Dec. 23, 2016, provisional application No. 62/438,743, filed on Dec. 23, 2016.

(51) Int. Cl.
*G06F 3/0484* (2013.01)
*G06F 3/0481* (2013.01)
*G06F 16/955* (2019.01)

(56) References Cited

U.S. PATENT DOCUMENTS

| | | | |
|---|---|---|---|
| 8,136,109 B1* | 3/2012 | Birdeau | G06F 8/24 |
| | | | 715/760 |
| 9,122,650 B1* | 9/2015 | Colton | G06F 16/986 |
| 10,037,352 B1 | 7/2018 | Dyer et al. | |
| 10,147,056 B1* | 12/2018 | Lopez | G06Q 50/12 |
| 10,205,678 B2* | 2/2019 | Dimitropoulos | H04L 67/02 |
| 10,339,299 B1* | 7/2019 | Magnuson | H04L 9/3239 |
| 10,783,019 B1* | 9/2020 | Kedar | G06F 21/31 |
| 2003/0088716 A1* | 5/2003 | Sanders | G06F 16/9577 |
| | | | 719/330 |
| 2006/0080546 A1 | 4/2006 | Brannon et al. | |
| 2009/0046846 A1 | 2/2009 | Lew et al. | |
| 2009/0235349 A1 | 9/2009 | Lai et al. | |
| 2009/0328177 A1 | 12/2009 | Frey et al. | |
| 2010/0024014 A1 | 1/2010 | Kailash et al. | |
| 2011/0223574 A1 | 9/2011 | Crawford et al. | |
| 2013/0036178 A1 | 2/2013 | Pitt | |
| 2013/0132809 A1* | 5/2013 | Tseng | G06F 16/9535 |
| | | | 715/205 |
| 2013/0179199 A1 | 7/2013 | Ziskind et al. | |
| 2014/0026194 A1* | 1/2014 | Smith | G06F 21/6245 |
| | | | 726/4 |
| 2014/0068737 A1 | 3/2014 | Micucci et al. | |
| 2014/0129457 A1 | 5/2014 | Peeler | |
| 2014/0129942 A1* | 5/2014 | Rathod | H04N 21/44222 |
| | | | 715/720 |
| 2015/0178861 A1 | 6/2015 | Gordon et al. | |
| 2015/0278171 A1* | 10/2015 | Lefebvre | G06F 17/2247 |
| | | | 715/760 |
| 2015/0370872 A1 | 12/2015 | Raghavan et al. | |
| 2016/0065555 A1 | 3/2016 | Branden et al. | |
| 2016/0277999 A1* | 9/2016 | Graves | H04W 40/244 |
| 2016/0314605 A1 | 10/2016 | Filippi et al. | |
| 2016/0349932 A1 | 12/2016 | Gorny | |
| 2017/0041296 A1* | 2/2017 | Ford | G06F 16/951 |
| 2017/0228467 A1* | 8/2017 | Bailly | G06F 16/951 |
| 2017/0279706 A1 | 9/2017 | Chen | |
| 2017/0329993 A1 | 11/2017 | Yao et al. | |
| 2017/0346758 A1* | 11/2017 | Dimitropoulos | H04L 67/02 |
| 2017/0352073 A1 | 12/2017 | Musti et al. | |
| 2018/0060283 A1* | 3/2018 | King | G06F 16/957 |
| 2018/0173390 A1 | 6/2018 | Dunne et al. | |
| 2018/0173715 A1 | 6/2018 | Dunne | |
| 2018/0173748 A1 | 6/2018 | Rasdale et al. | |
| 2018/0322571 A1 | 11/2018 | Vea et al. | |

FOREIGN PATENT DOCUMENTS

| | | |
|---|---|---|
| EP | 2357558 | 8/2011 |
| EP | 3559830 | 10/2019 |
| EP | 3559879 | 10/2019 |
| WO | 2013054196 | 4/2013 |
| WO | 2013082654 | 6/2013 |
| WO | 2017107367 | 6/2017 |
| WO | 2018117967 | 6/2018 |
| WO | 2018117968 | 6/2018 |

OTHER PUBLICATIONS

International Preliminary Report on Patentability issued in International Application No. PCT/SG2017/050633 dated Jun. 25, 2019, 12 Pages.

Keshav R et al., "Towards a taxonomy of architecture integration strategies", 3rd International Software Architecture Workshop, Nov. 1-2, 1998, 4 pages.

International Search Report and Written Opinion issued in International Application No. PCT/SG2017/050634 dated Mar. 2, 2018, 11 pages.

International Preliminary Report on Patentability issued in International Application No. PCT/SG2017/050634 dated Jun. 25, 2019, 9 pages.

International Search Report and Written Opinion issued in International Application No. PCT/SG2017/050636 dated Mar. 6, 2018, 10 pages.

International Preliminary Report on Patentability issued in International Application No. PCT/SG2017/050636 dated Jun. 25, 2019, 7 pages.

Andrew Beers, "Embedding Tableau in Your Portals, Websites and Applications", Jul. 18, 2013 (Jul. 18, 2013), https://web.archive.org/web/20130718005719if_/http://mkt.tableausoftware.com:80/downloads/embedding_views.pdf, 32 pages.

Melnick, J., "How to Create New Active Directory Users with PowerShell". Jun. 2018. (Year: 2018), 9 pages.

Non-Final Office Action dated Mar. 26, 2020 in U.S. Appl. No. 15/847,245, 13 pages.

Non-Final Office Action dated Apr. 7, 2020 in U.S. Appl. No. 15/850,517, 22 pages.

* cited by examiner

CONTENT MANAGEMENT SYSTEM EXTENSIONS

RELATED APPLICATIONS

This application claims priority to the following applications: U.S. Provisional Patent Application Ser. No. 62/437,571, entitled "Content Management System Extensions for Integrating with Dynamic Content Features," filed Dec. 21, 2016; U.S. Provisional Patent Application Ser. No. 62/438,709, entitled "Maintaining User Preferences Across Portal Content Interfaces," filed Dec. 23, 2016; and U.S. Provisional Patent Application Ser. No. 62/438,743, entitled "Static Single Page Web Application-Based Dashboard Platform using Container-Based Architecture with Application-Based State Management," filed Dec. 23, 2016. All above identified applications are hereby incorporated by reference in their entireties.

BACKGROUND

The basic functionality of a Content Management System (CMS) platform is to handle all user interactions through its interface (e.g., server-side). A CMS will dispatch requests and route users accordingly in order to deliver the required navigation through the application, rendering the appropriate content for the user as they migrate through system information, all in a secure fashion. In essence, the CMS platform can be viewed as offering a user management engine (e.g., storing and authenticating information about users, their roles, and their permissions), a content management engine, and a content navigation engine (e.g., web engine).

There is a need, in organizations, to supply dynamic and interactive front-end interfaces to users of a CMS. An example of a dynamic interface is a Java-enabled interface or Single Page Application (SPA). A SPA is a web application or web site contained in a single web page, where the web page dynamically updates based upon user interaction with the application. The dynamic interface may be updated through initial download of all code (e.g., JavaScript, cascading style sheets (CSS), hypertext markup language (HTML), etc.) at initial page load. Alternatively, the dynamic interface may be capable of dynamically loading resources responsive to user interaction. Regardless of the implementation of the dynamic framework, the user interface created through a dynamic front-end framework mimics a desktop application environment from the viewpoint of the user.

Further, organizations at times require customized authentication mechanisms, such as integration with an acceptance of terms of use graphical user interface (GUI). The solution, for example, may enable dynamic interface rendering in a CMS system and override some default behavior of the CMS. The solution may also support continued usage of the CMS for authentication purposes.

For these reasons, the inventors developed customized CMS extensions providing a hybrid CMS/SPA environment while maintaining user authentication and security functionalities provided by the user management component of the CMS.

Data analytics interfaces are often built using a sheet file structure or workbook file structure. Using these file structures, similar to a spreadsheet application, developers can generate dashboards or views of information. The information can be viewed, for example, through a content management system integrated with the sheet file structure or workbook file structure. Typically, upon accessing particular content associated with a particular sheet file or workbook file, user preferences are applied at the sheet- or workbook-level.

The data analytics interfaces can be built through a content development system. A content development system is a server-based system or cloud-hosted system for developing and deploying analytics content for dashboard interfaces. The content development system, for example, may interface with an analytics data store to pull real time generated content into a graphical user interface for presentation to the end user. The content development system may provide tools for integrating data sources, calculations, metadata, and data field information with coded web parts to generate real time dynamic interactive content.

User preferences associated with data analytics are often derived from unique aspects of the user such as, in some examples, the user's geographic location, the user's industry, or the user's role within the content management system. For this reason, users often apply the same preferences, such as filtering selections, across multiple sources of content (e.g., multiple dashboard interfaces) within the analytics ecosystem.

For this reason, the inventors identified a need for maintaining global user preferences and applying these preferences across multiple content interfaces within a user portal to the analytics ecosystem. These user interfaces, in some examples, can include role-driven CMS content, dynamic data visualizations, and data analytics dashboards including dynamically produced graphs and charts. In particular, the inventors developed solutions for contextually applying global user preferences to every workbook file or sheet file as it initially loads, and maintaining these preferences within the dynamic data display throughout subsequent user navigation (e.g., clicks and interactions within the dashboard interface).

In particular, the inventors identified a goal of putting the user preference persistence control at the data source layer and switching data source according to the user preferences (e.g., user permissions, filter settings, CMS role, organizational settings, and other user-related information relevant to customizing individual dynamic content displays within the analytics ecosystem).

The inventors further identified a goal of passing user preference information to the dynamic data content upon provision to a user from the CMS, supporting presentation of refined dashboard interface information based upon the previously stored settings.

A Single-Page Web Application (SPA) allows for a user experience similar to interfacing with a desktop application, where the interactive web-based user interface (UI) is retrieved with a single page load and fits on a single page view (e.g., within a browser). Run time code, such as HTML, JavaScript, and/or CSS, is retrieved and dynamically rendered to generate the UI. The page itself typically does not manage or control navigation between user interfaces within the web application. Instead, application program interfaces (APIs) control transfer between pages.

SPA designs support fluid navigation, enhancing the user experience. Additionally, since components of the SPA can be downloaded piecemeal on an as-needed basis, network performance may be improved as opposed to single page applications which require loading of new pages during navigation. An HTTP API, for example, may supply the access mechanism to connect to the server side data access layer or business layer. Because an API is used to retrieve updates to the SPA, changes to the server side components require no change in the user interface deployment.

A static single page web application is a SPA developed using static files, such as Hypertext Markup Language (HTML), JavaScript (JS), Cascading Style Sheets (CSS), and/or media assets (e.g., static images or videos). A static SPA supports auto-generation of cross-platform applications (e.g., both traditional browser-based desktop applications and mobile applications).

Because the front-end architecture including the static SPA does not require linking to server-side technology such as .NET or Java, the application is portable to a variety of execution environments (e.g., web server such as Node.js, IIS, or AWS).

The inventors identified a benefit in using a new SPA application architecture for increased scaling capacity and simpler logic analysis. As discussed below, in light of the desired features reviewed above, the inventors developed a new application architecture to provide an improved end user experience, faster development times, and easier maintenance.

SUMMARY OF ILLUSTRATIVE EMBODIMENTS

As illustrated in FIG. 1, in a common prior art request handling operational flow 100 of a content management system 106, a request 102 (e.g., received through an application programming interface (API)) is forwarded via an appropriate event handler 104a-104n (e.g., associated with the particular API) to an appropriate module of the CMS 106. In one example, the request 102 includes a resource identifier, such as a uniform resource locator (URL) or uniform resource identifier (URI), requesting web content. Information may be contained (e.g., embedded) in the resource identifier of the request 102. Further, the request 102 may include metadata content, such as user identification content. The externally-exposed (e.g., user driven) event handlers designed to respond to web content resource identifiers supplied to the CMS 106 in the form of requests, in some examples, can include security events, document events, import/export events, control events, and/or page events.

Typically, a CMS includes a user management handling module 108 configured to manage user information and a content management handling module 110 for identifying and packaging web content for delivery to the user. The user management handling module 108 and the content management handling module 110 are each in communication with a CMS core 112 and a content navigation module 114. The content navigation module 114, for example, packages the resultant information provided through the user management module 108 and the content management module 110 for review by the user (e.g., the user submitting the request 102). In a particular example, the content navigation module 114 may manage content navigation state (e.g., through a web content tree or other navigational construct for managing the navigation path of the user). In another example, the content navigation module 114 may manage loading of requested web content to the user interface once collected by the content management module 110.

In operation, the user management module 108 may perform both user authentication operations and user permissions (or restrictions) operations to deliver appropriate content based upon a particular user. In authenticating a user, in a general sense, the CMS 106 may authenticate the user across all trusted domains within the content management system 106 and any third-party integrations. For example, the user management module 108 may authenticate the user with the CMS 106 itself, as well as one or more cloud-based data sources, widget providers, and other trusted CMS 106 partner tools. In this manner, the user logs in once and has seamless access to tools which are enabled for centralized user administration under the CMS user management module 108.

Upon authentication of the user, the user management module 108 may manage user permissions for accessing content provided by the content management module 110. The content available to a particular user, for example, may be based upon the user information itself, or a combination of information (e.g., user organization, user role within an organization, user role within the CMS 106, user permissions established in the CMS 106, etc.). In a particular example, a particular user may be associated with a role having a membership of a number of team members, as well as permissions associated with the user's given role. Further, the basic user interface may be customized for a particular role such that portions of the interface are activated for members sharing the particular role, while other portions of the interface are deactivated. The portions of the user interface exposed and/or denied to the user's role, for example, may be selected on a module basis (e.g., enabling/disabling the visualization of individual dialogs forming a dashboard interface). In a further example, dynamic interactive applications developed for presentation within a given dashboard may be selectively enabled/disabled based upon a user's role.

The content management module 110 may then provide content for display via the content navigation module 114 based upon the user permissions identified by the user management module 108. The content management module 110, for example, may control selection and provision of web content (e.g., web parts, widgets, layout templates, etc.) for review by a user, access to multimedia content, and translation of multilingual content. The selection, provision, and/or translation, for example, may be based upon the user permissions extracted by the user management module 108.

The illustrated operational flow in FIG. 1, however, does not support a front-end web application framework for delivering dynamic and interactive web applications to the end user which bypass the server-side selection and provision of content by the content management module 110. The dynamic interface, instead, may be updated through initial download of all code (e.g., JavaScript, cascading style sheets (CSS), hypertext markup language (HTML), etc.) at initial page load. Alternatively, the dynamic interface may be capable of dynamically loading resources responsive to user interaction (e.g., translating user interactions into commands for selective and dynamic content update, rather than receiving HTML link selections for loading another canned view of information served up by an end server).

A front-end web application framework supports development, testing, and deployment of cross-platform dynamic interactive web applications. Using a front-end web application framework, for example, developers can more readily customize user interface aspects based upon varying user roles, permissions, and organizational settings within the analytics platform.

In a first example, the front-end web application framework can support model-view-controller (MVC) interface design, where the web application is separated into three interrelated portions. The model portion manages data, logic, and rules of the application, while the view portion defines the output representation of data (e.g., charts, graphs, diagrams, etc.). The controller portion manages the user interaction interface, translating user interactions into commands for the model portion and/or the view portion.

In another example, the front-end web application framework can support model-view-viewmodel (MVVM) interface design, where the web application is separated into the model and view similar to the MVC framework, as well as a viewmodel portion which replaces the controller of the MVC. The viewmodel portion functions as an intermediary between the view portion and the model portion, managing the logic backbone of the web application. The viewmodel portion, for example, invokes methods in the model classes of the model portion. The viewmodel portion provides data from the model to the view in a format useful to the view. Further, the viewmodel may manage state changes within the web application and commands triggered through user interaction with the web application.

In operation, a front-end web application framework is incorporated into a software stack (or software bundle) for supporting development and deployment of interactive dynamic web content. The software stack, for example, may include a database, at least one web application framework, and an execution environment. The execution environment provides an abstraction layer on top of the native operating system and hardware environment, increasing portability and scalability. The database manages storing data (e.g., on behalf of the model portion of the web application framework and the execution environment).

To migrate from static single-page web interfaces to a dynamic SPA interface, the inventors redesigned the front-end architecture, combining container-based data fetching management with intricately controlled state management and user experience routing within a dashboard environment.

In some embodiments, a new SPA application architecture depends on a JavaScript (JS) library for building interactive user interfaces that supports description of the graphical user interface as a function of state, where encapsulated components or containers manage their own states. This means that the GUI functionality will be declarative (what the developer intends the GUI do next) rather than imperative (how the GUI should perform the next step). Further, the JS library can include persistent, immutable data structures to maintain state integrity. A container component, for example, can support the data fetching function for data analytics rendering, while a display component can manage rendering of the user interface presenting the data analytics.

In some embodiments, rather than providing a library framework with static APIs, the new SPA application architecture relies on function generation for application state management. The functions accept the previous UI state and an action, and return the next state as a new state object. As the application grows, the function branches into additional functions designed to manage specific portions of the application state tree. Additionally, because state is managed using function generation, additional data can be passed into the functions when moving to a new state.

The forgoing general description of the illustrative implementations and the following detailed description thereof are merely exemplary aspects of the teachings of this disclosure, and are not restrictive.

BRIEF DESCRIPTION OF THE DRAWINGS

The accompanying drawings, which are incorporated in and constitute a part of the specification, illustrate one or more embodiments and, together with the description, explain these embodiments. The accompanying drawings have not necessarily been drawn to scale. Any values dimensions illustrated in the accompanying graphs and figures are for illustration purposes only and may or may not represent actual or preferred values or dimensions. Where applicable, some or all features may not be illustrated to assist in the description of underlying features. In the drawings.

DETAILED DESCRIPTION OF ILLUSTRATIVE EMBODIMENTS

The description set forth below in connection with the appended drawings is intended to be a description of various, illustrative embodiments of the disclosed subject matter. Specific features and functionalities are described in connection with each illustrative embodiment; however, it will be apparent to those skilled in the art that the disclosed embodiments may be practiced without each of those specific features and functionalities.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments. Further, it is intended that embodiments of the disclosed subject matter cover modifications and variations thereof.

Figure 2:
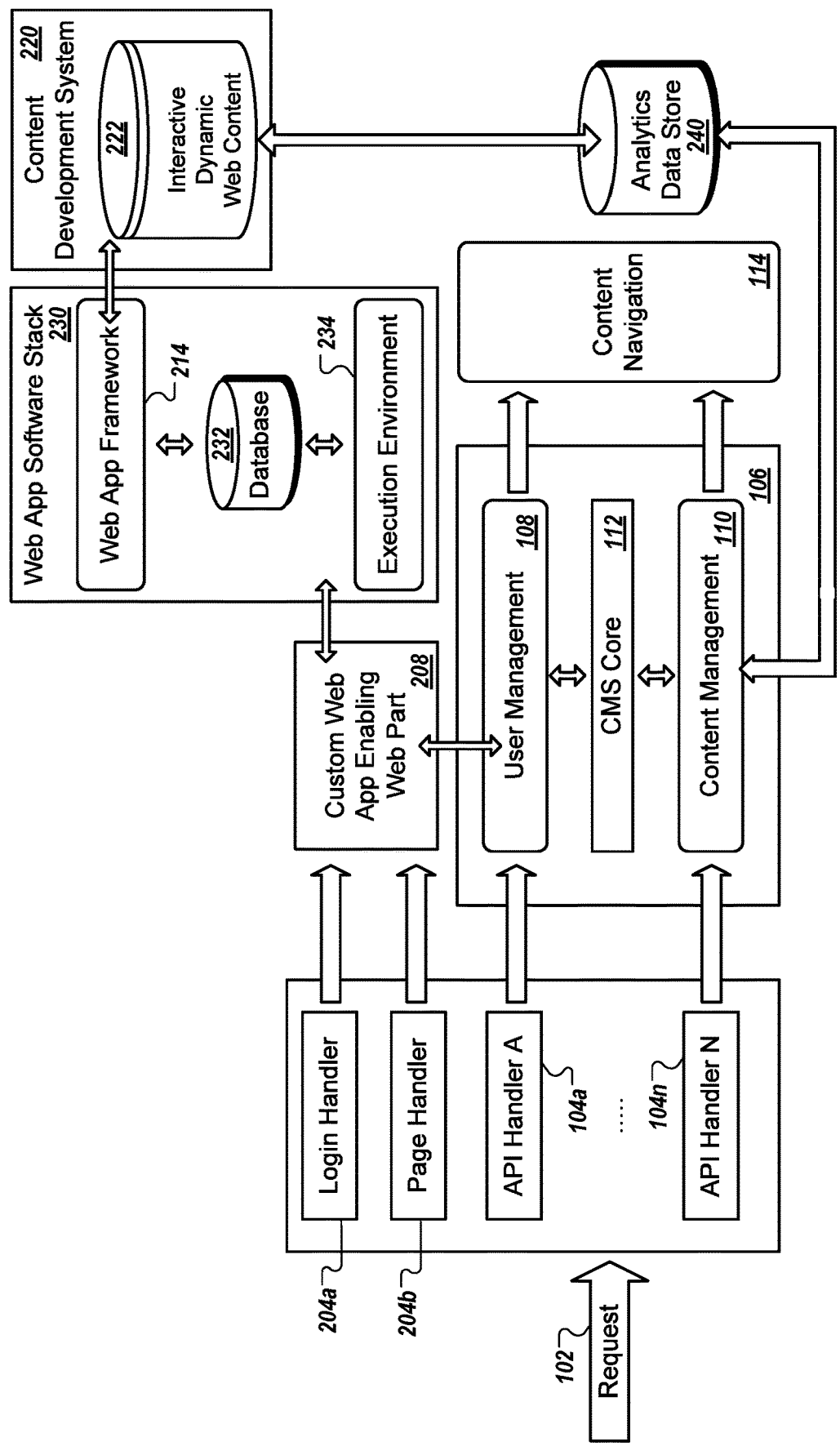
FIG. 2 is a flow diagram of an example modified request handling operational flow having a content management system extended to cooperate with a front-end web application framework.

To incorporate a front-end web application framework into the analytics environment and thus extend the ability of the CMS system, turning to FIG. 2, the traditional CMS handlers 104a-104n can be extended to include a login handler 204a and a page handler 204b. Either of the login handler 204a and the page handler 204b may be created through modifications or extensions of preexisting handlers 104 developed for interfacing with the CMS 106. The login handler 204a and the page handler 204b are designed to communicate with a custom web part 208 which overrides default handling of the user management module 108. The custom web part 208, for example, may inject information for use by the user management module 108.

By customizing CMS handlers 104a-n, the CMS API is not directly exposed to the dynamic interactive web content. This promotes security in the system, since API endpoints provided in the web layer would potentially enable end client manipulation of the CMS 106, possibly resulting in access to sensitive data and/or attack on the functionality of the CMS 106 itself.

The custom login handler 204a customizes authentication, providing access to the authentication data. The authentication data, for example, may include user information, user name, and user password. Further, upon authorization, the custom login handler 204a has access to a session token supplied on behalf of the CMS 106 for user access to managed content. The login handler 204a can further enable access to user permissions, roles, etc. through calls to the user management module 108 using the user information derived through the custom login handler 204a.

The custom page handler 204b can be used to redirect a page load event, usurping the conventional handling provided by the content management module 110. The custom page handler 204b, for example, can interface with a front-end web application framework 214 to deliver dynamic interactive content to the requesting user. For example, the custom page handler 204b may supply an instance of the custom web part 208 responsive to the user request 102.

In some embodiments, the front-end web application framework 214 is incorporated into a software stack 230 (or software bundle) for supporting development and deployment of interactive dynamic web content. The software stack 230, for example, may include a database 232, at least one web application framework 214, and an execution environment 234. The execution environment 234 provides an abstraction layer on top of the native operating system and hardware environment, increasing portability and scalability. The database 232 manages storing data (e.g., on behalf of the model portion of the web application framework 214 and the execution environment 234).

Custom handlers, in general, may be attached to particular events (e.g., type of request entering the CMS system). Where the custom handlers wrap the original functionality, for example to add to the core process provided by the original CMS handler, the custom handler can be referred to as a handler wrapper. The custom handler wrapper, for example, may include the ability to share variables (e.g., pass in and out) with the original CMS handler.

Once a custom handler is developed, the handler can be registered to perform custom actions based upon events and/or API calls into or within the CMS 106. Registration of the custom handler, for example, may involve adding the custom handler to the initialization of the application (e.g., loading of the module designed to work with the custom handler). For example, the custom login handler may be registered through adding the custom login handler to the initialization process of the user management module.

The custom web part 208 may be designed as a web form control or other data delivery control embedded into a template web page or other user interface developed by the CMS 106 (e.g., by the content management module). The custom web part 208 may host dynamic interactive data content by bootstrapping the CMS-generated content with particular dynamic interactive web content such as a Java-enabled interface or Single Page Application (SPA). The bootstrapping may be done by injecting a path to the dynamic interactive web content, and other metadata such initial settings to configure how the dynamic interactive web content first renders, into the CMS-generated web page via the custom web part 208. The CMS user session token obtained through the custom login handler 204a, additionally, may be injected into the CMS-generated web page via the custom web part 208 to enable the CMS user token to be reused within the dynamic interface for any authenticated API calls.

In operation, the page handler 204b and/or login handler 204a provide the opportunity to develop dynamic interactive content independently of the CMS system, using the injected metadata to trigger initial rendering to the user. The dynamic interactive web application session functionality is further enabled through authenticated API calls supported by the CMS user token.

To enable the authentication functionality via the session token embedded in the dynamic interactive content, the custom login handler 204a (e.g., acting as a pseudo single sign on (SSO) service) may wrap the CMS login handler (e.g., one of 104a-104n), checking authentication using the session token passed by the dynamic interactive content. The custom login handler 204a may then delegate to a user management API, such as a business API which returns business data. The API, for example, may interface with the user management module 108 to obtain role-based or organizational-based permissions associated with the user.

To increase security, in some embodiments, the session token expires after a set period of time. In another example, the session token may expire after a period of inactivity.

To add new dynamic interactive web content to the system, rather than adding files to the CMS 106 (e.g., accessible to the content management module 110), the custom web part 208 provides the interface to directly load materials developed through a separate content development system 220. The content development system 220, for example, is a server-based system or cloud-hosted system for developing and deploying analytics content for dashboard interfaces. The content development system 220, for example, may interface with an analytics data store 240 to pull real time generated content into a graphical user interface for presentation to the end user. The content development system 220 may provide tools for integrating data sources, calculations, metadata, and data field information with coded web parts to generate real time dynamic interactive content 222.

Although the user management module 108 performs user authentication operations, the CMS 106 may lack the ability to handle a Terms and Conditions acceptance process built into the user credential dialogue at the user interface. To expand the basic CMS user authentication mechanisms, similar to the extensions discussed above in relation to FIG. 2, the CMS login handler can be customized to handle more a more complex user authentication process, such as a user authentication process involving acceptance of a site's Terms and Conditions.

Figure 1:
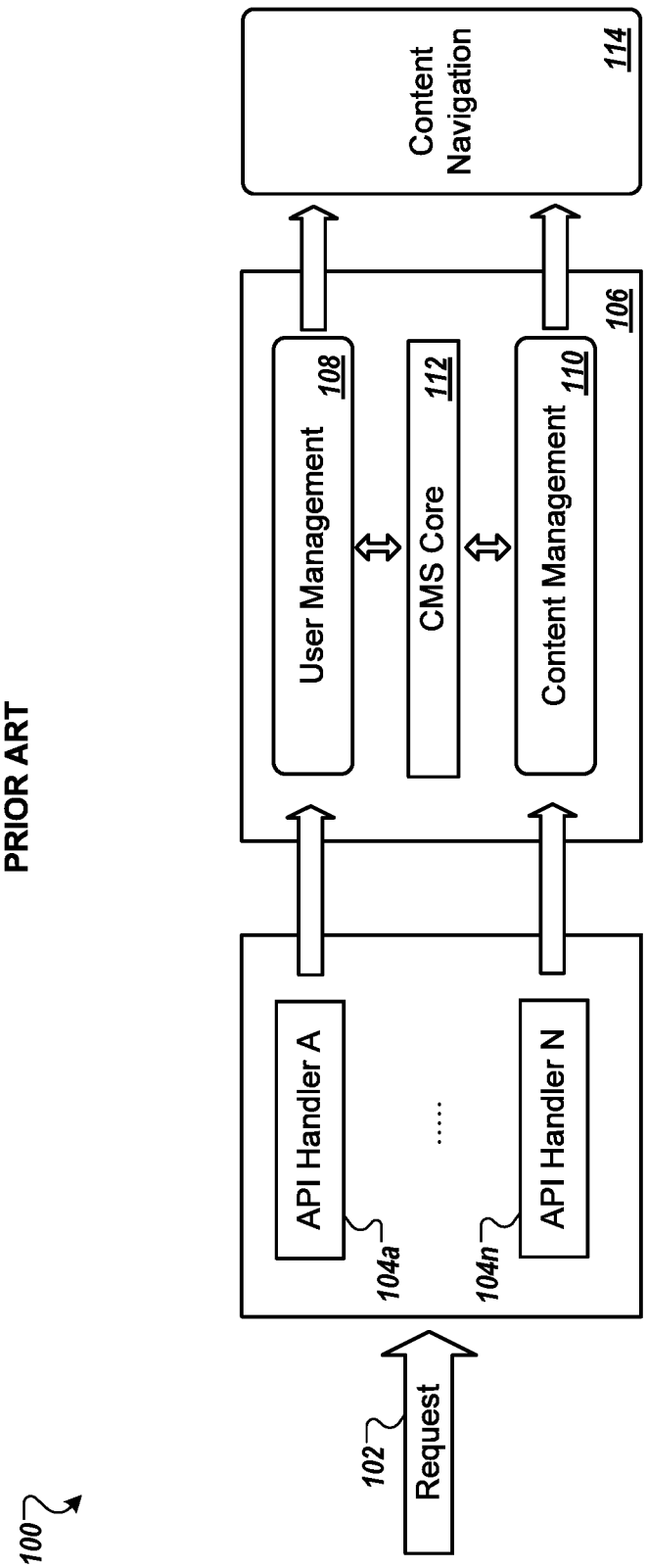
FIG. 1 is a flow diagram of a common prior art request handling operational flow of a content management system.
Figure 3:
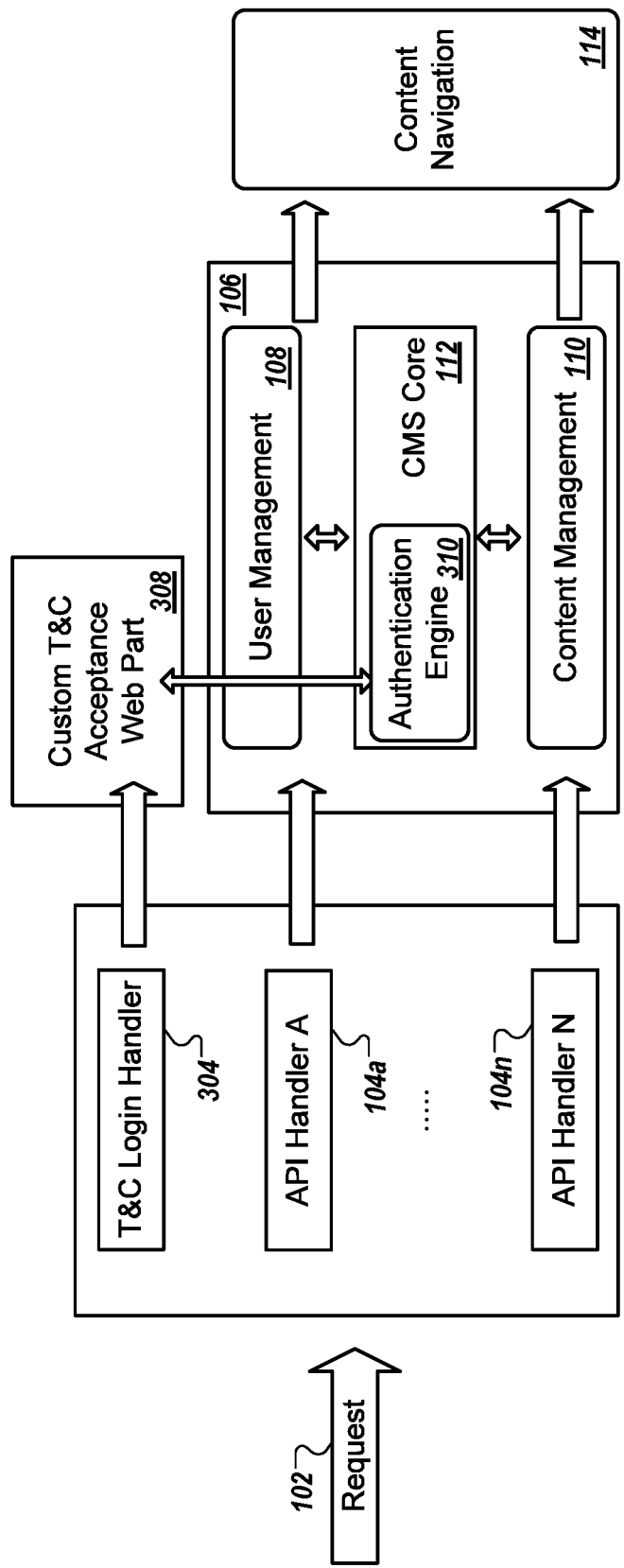
FIG. 3 is a flow diagram of an example request handling operational flow including a custom login handler communicating with a content management system.

Turning to FIG. 3, to achieve Terms and Conditions acceptance prior to logging in, a custom terms & conditions login handler 304 is provided to intercept calls that would otherwise be directed to the preexisting CMS login handler (i.e. one of 104a-104n). The custom T&C login handler 304 is designed to hook into a custom T&C web part 308, overriding the standard behavior of the CMS 106, as illustrated in the differences between FIG. 1 and FIG. 3.

The custom T&C web part 308, in some embodiments, overrides at least a portion of the user management 108 functionality. For example, upon confirming acceptance of Terms and Conditions, the custom T&C web part 312 may supply authentication information directly to an authentication engine 310 of the CMS Core 112 for processing.

Although illustrated as two separate custom login handlers 204a, 304 and custom web parts 208, 308, the login handlers 204a, 304 and web parts 208, 308 of FIGS. 2 and 3 may be combined to support implementations where terms & conditions are only used in circumstances where the user will be provided dynamic interactive web content.

Figure 4A:
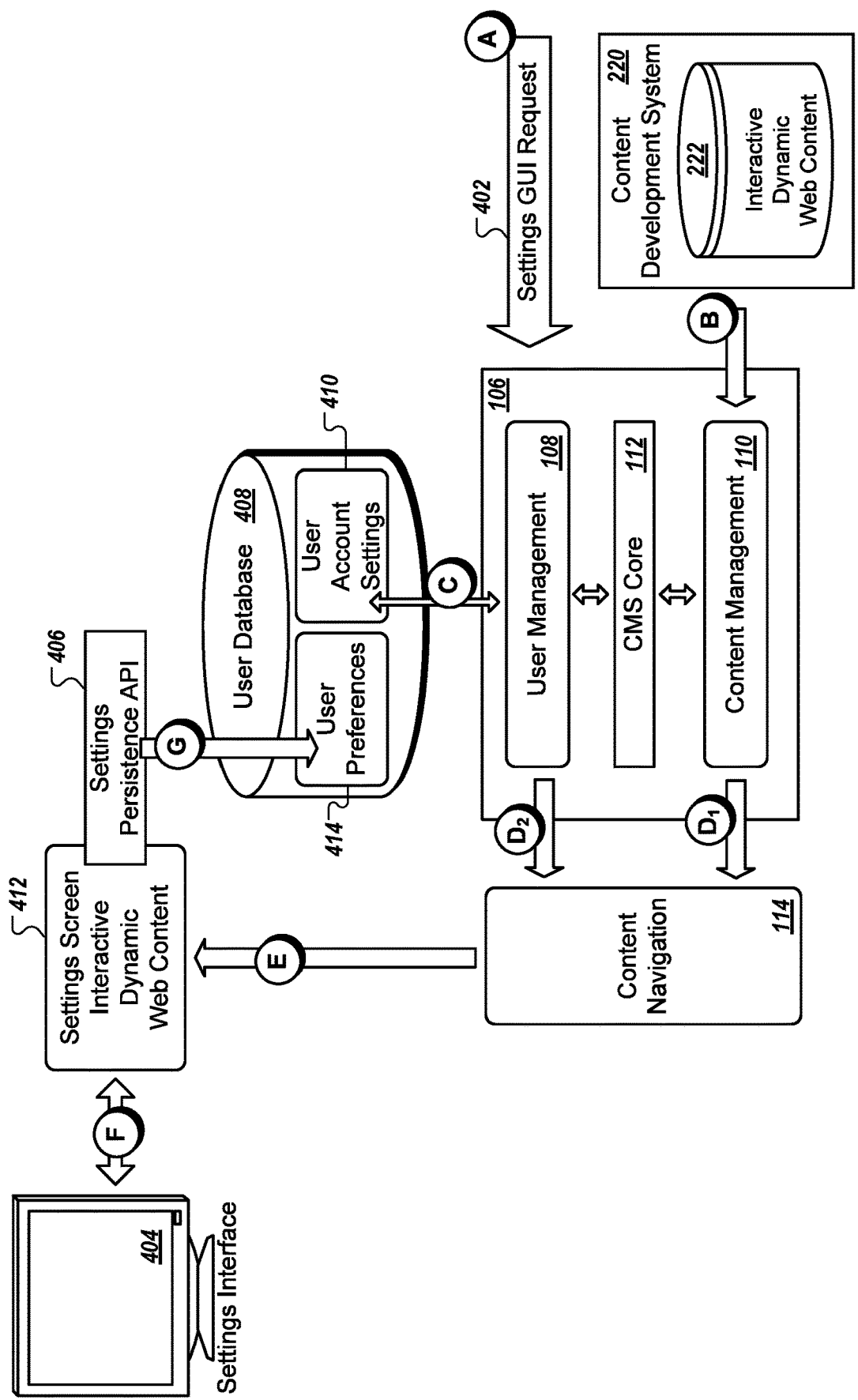
FIG. 4A is an example operational flow for establishing persistent user settings for use while receiving dynamic content at a dashboard user from a content management system.

In some embodiments, as illustrated in an operational flow of FIG. 4A, user settings may be perpetuated through interfacing with the user management module 108 of the CMS 110. User settings, for example, are initially set up through a user settings graphical user interface (GUI) 404 provided to the user. A back-end application programming interface (API) 406 captures the settings and stores them to a user information database 408, allowing cross-referencing of the user settings with additional dashboard interfaces. The user settings persistence API 406, for example, may be implemented using representational state transfer (REST) API communications. A REST API is a web service, allowing for black box (e.g., platform/language independent) intercommunication using uniform resource identifiers (URIs). A RESTful API decouples communication interactions (e.g., no conversational state) by operating in a stateless set of predefined operations, allowing for greater scalability. The predefined operations, such as GET, POST, PUT, and DELETE, allow requesting systems to access and manipulate textual representations of web resources. The user settings persistence API 406, for example, may be designed to communicate with a database manager API. In another example, the user settings persistence API 406 is designed to communicate with the user management module 108 of the CMS.

The operational flow begins at step A with the CMS 106 receiving a request 402 from a client computing device for the user settings graphical user interface (GUI) 404. For example, the request 402 may have been received from a settings screen interactive dynamic web content or predecessor dynamic web content (e.g., other user navigational interface) presented to the same user. The content management module 110, at step B, gathers web content, such as a sheet file structure or workbook file structure, for generating the user settings GUI. At step C, the user management module 108 accesses user account settings 410 in the user database 408 to determine user permissions to particular content (e.g., which user settings and roles are applicable to the requesting user). This information can be used by the content management module 110 for collecting (step B) or filtering the collected information prior to supplying the information to the content navigation module 114 at step D1. The user management module 108 may also provide information, such as an authentication token, to the content navigation module 114 for authenticating communications with the user (step D2). The authentication token, further, may supply trusted authentication with further components within the content management system 106 and the greater data analytics ecosystem.

The content navigation module 114, at step E, serves a settings screen interactive dynamic web content 412 for presenting the user settings GUI 404 to the requesting user.

The dynamic web content 412 includes the settings persistence API 406 designed to persist user settings for later use by additional dashboard interfaces. The dynamic web content 412, in some examples, may be a Java-enabled interface, Single Page Application (SPA), Javascript dynamic interface, or C# .NET interface. A SPA is a web application or web site contained in a single web page, where the web page dynamically updates based upon user interaction with the application. The dynamic interface may be updated through initial download of all code (e.g., JavaScript, cascading style sheets (CSS), hypertext markup language (HTML), etc.) at initial page load. For example, the code may be accessed from the interactive dynamic web content data store 222 of the content development system 220 (described in relation to FIG. 2) by the content management module 110 of the CMS 106. Alternatively, the dynamic web content 412 may be capable of dynamically loading resources responsive to user interaction. Regardless of the implementation of the dynamic framework (see, for example, the web app software stack 230 of FIG. 2), the user settings GUI 404 may mimic a desktop application environment from the viewpoint of the user.

As the user interacts with the user settings GUI 404 at step F, the settings screen interactive dynamic web content 412 will continue to present updated options to the user. The user settings, for example, may identify one or more filtering topics for filtering displayed material to present information relevant to the user. In the dashboard analytics platform, users (e.g., insurance carriers, brokers, and reinsurers) may choose to specify filtering settings defining one or more geographic regions, industries, products, product types, and/or lines of business, in some examples.

Meanwhile, at step G, the received settings may be committed to a user preferences data store 414 of the user information database 408 for later access. In another option, the dynamic web content 412 may track the user settings until final commit (e.g., user completion of interaction with the user settings GUI 404), at which time the dynamic web content 412 triggers storing of the user settings to the user preferences data store 414 of the user information database 408 via the settings persistence API 406. For example, the settings persistence API 406 may communicate with a database manager API by handing user settings through to the database manager API via a URI containing a set of user settings. The set of user settings may include a large number of settings (e.g., multiple geographic regions, product types, lines of business, etc.), such as more than 10, more than 20, or more than 30 individual user settings.

The user settings, where applicable, may be grouped. For example, rather than selecting all European countries individually, the user settings GUI 404 may provide the opportunity to select "Europe" in general (or, optionally, regions of Europe such as Northern Europe, Eastern Europe, etc.).

Although illustrated as a single user information database 408, the user persistence settings may be stored separately from user authentication information, for example for security purposes.

Figure 4B:
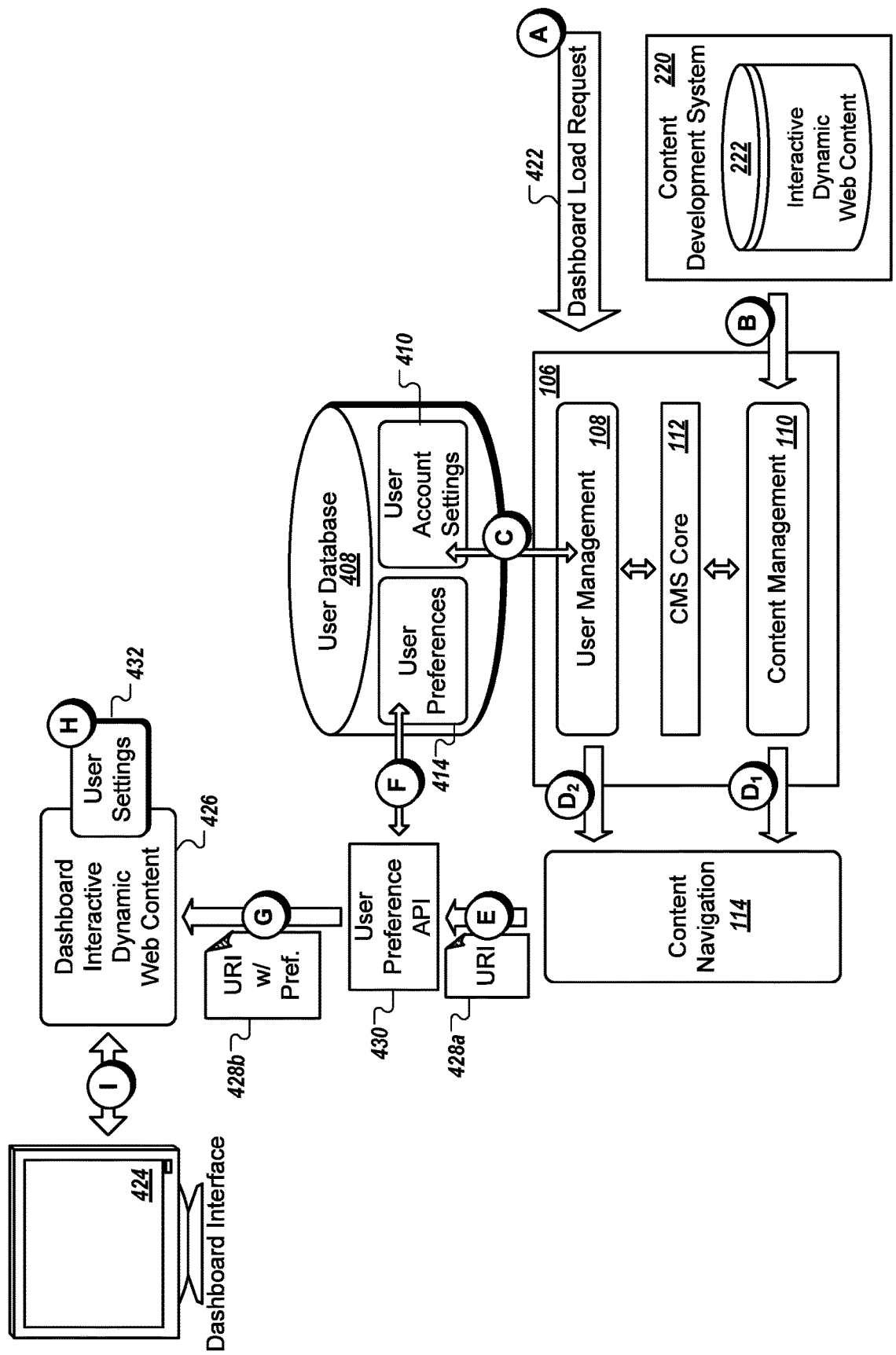
FIG. 4B is an example operational flow for managing persistent user settings while supplying dynamic content to a dashboard user.

Turning to FIG. 4B, in some implementations, when loading a subsequent visualization (e.g., a dashboard interface 424), the user preferences 414 established through the process flow of FIG. 4A will be applied to the visualization by transferring the set of user preferences 414 to a dashboard web content 426 via a uniform resource identifier (URI) 428a containing the preferences embedded within 428b. The URI 428a, 428b may be a uniform resource locator (URL).

Similar to FIG. 4A, the process flow of FIG. 4B begins with receiving a dashboard load request 422 at the CMS 106 from the user at step A. The content management module 110, at step B, gathers web content, such as a sheet file structure or workbook file structure, for generating the dashboard GUI. At step C, the user management module 108 accesses the user data base 408 to determine user permissions to particular content (e.g., which user settings and/or roles 410 are applicable to the requesting user). This information can be used by the content management module 110 for collecting (step B) or filtering the collected information prior to supplying the information to the content navigation module 114 at step D1. The user management module 108 may also provide information, such as an authentication token, to the content navigation module 114 for authenticating communications with the user (step D2).

The content navigation module 114, at step E, serves the dynamic web content 426 in the form of the URI/URL 428a for presenting the dashboard GUI 424 to the requesting user. The dynamic web content 426, in some examples, may be a Java-enabled interface or Single Page Application (SPA). The dynamic web content 426 may be generated based upon a collection of worksheets defining dashboard views of the dashboard interface 424. The worksheets, along with additional content needed to render the individual dashboard views (e.g., data sources such as libraries, image content, and/or other multimedia content), may be provided in the form of a dynamic interactive web content workbook. For example, the workbook may be accessed from the interactive dynamic web content data store 222 of the content development system 220 by the content management module 110 of the CMS 106.

At step F, a user preference API 430 intercepts the URI/URL 428a supplied by the content navigation module 114 and accesses user preferences 414 from the user information database 408 to append to the URI/URL 428a for transference to the dashboard web content as the enhanced URI/URL 428b. The user preference API 430, for example, may be designed to intercept the URI/URL 428a upon loading a dynamic interactive web content workbook. In some implementations, global user preferences 414 are passed in to the user preference API 430. In other implementations, multiple sets of user preferences 414 exist, and the user preference API 430 requests user preferences appropriate to the current dashboard interactive dynamic web content 426. User preferences related to reviewing transaction statistics, for example, can differ from user preferences related to transaction workflow user interfaces. In some embodiments, different sets of user preferences may be organized in different storage regions. For example, the user preferences 414 are not necessarily maintained in a same user database 408 as the user account settings 410 or as other user preference sets.

By implementing a URL transfer mechanism, the total number of user preferences capable of being transferred may be limited. For example, the length of URL may limit the amount of information capable of being transferred. In a particular example, the maximum URL length supported by the Internet Explorer browser is 2,083 characters. Often, developers will limit URL lengths to 2,000 characters to ensure interoperability with a wide variety of popular web browsers. To remedy this problem, in one example, the individual preferences may be supplied as a string of binary settings (e.g., 0="not selected", 1="selected") or groupings of settings (e.g., geographic region settings, industry settings, etc.) may be provided as hexadecimal strings converted to binary settings, to maximize the number of settings capable of transfer to the dynamic web content.

The user preference API 430, at step G, provides the URI/URL with embedded user preferences 428b to the dashboard interactive dynamic web content 426.

The user preferences 414, for example, may be stored as a user settings part 432 of the workbook. at step H. In this manner, as the user navigates within the dashboard 424 at step I, the dynamic web content 426 can maintain consistent user preferences through referencing the user preferences 414 when generating new views based upon the workbook sheets.

Figure 4C:
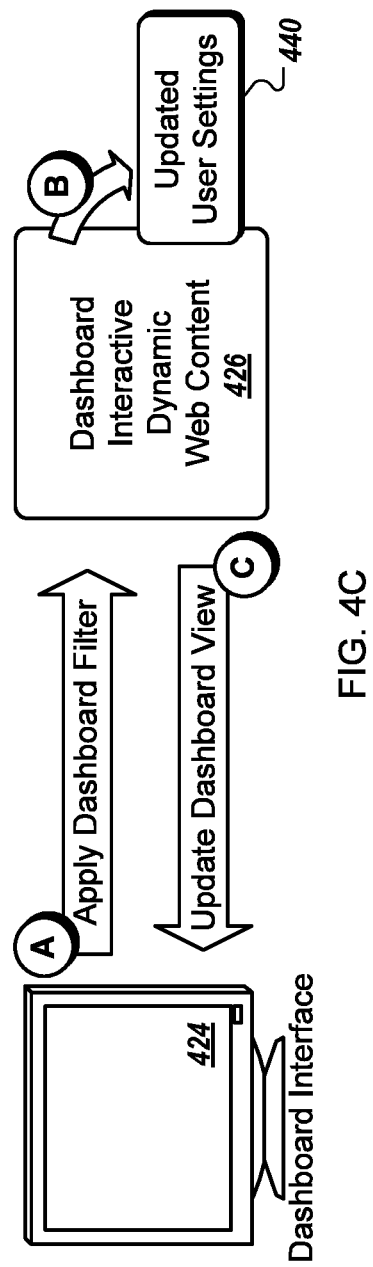
FIG. 4C is an example operational flow for updating user settings while a dashboard user navigates dynamic content within a dashboard interface.

Turning to FIG. 4C, while navigating through the dashboard interface 424, the user may modify the previously supplied user preferences 414. The user may be provided with a number of filtering controls or other settings controls within the dashboard interface 424 to customize the data visualization.

In an example operational flow, at step A, the user may use a filter control of the dashboard interface 424 (e.g., drop-down menu) to apply a dashboard filter, overriding a previously supplied user preference 414 or adding an additional user preference. Responsive to this interaction, the dashboard web content 426 may store updated user settings 440 (e.g., to the workbook user settings library) and uses the updated user settings 440 for the remainder of the dashboard GUI interactions. For example, when supplying an updated dashboard view at step C, the dashboard web content 426 will apply the updated user settings 440.

The updated user settings 440, in the example of FIG. 4C, are not perpetuated to the user information database 408. Only those user preference settings 414 supplied by the user via the user settings GUI 404 (FIG. 4A) are maintained by the CMS 106. Since the user settings 414 are overwritten within the workbook but not perpetuated back to the user information database 408, user confusion may ensue regarding the permanency of changes. Alternatively, rather than supplying user preferences 414 embedded in the content URL/URI 428b, user preferences 414 may be injected into the dynamic interactive web content 426 through the data set itself which is returned from the CMS 406. Using this solution, the user preferences 414 can be mined to include only those relevant to the present data set, and the user preferences 414 can be cleared (e.g., reset to their default value) whenever a new data set (e.g., a new navigational screen including different data) is loaded.

Figure 5:
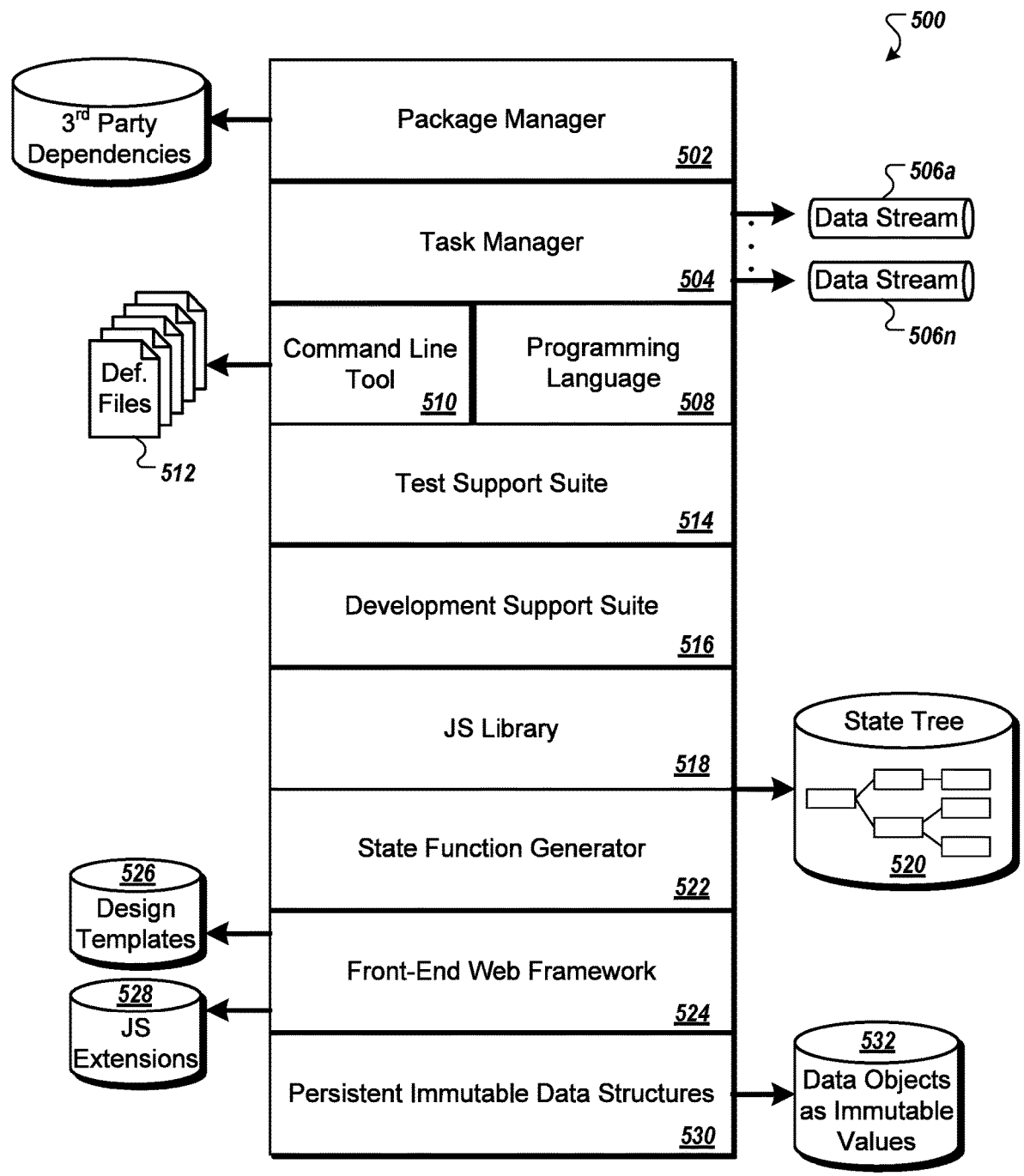
FIG. 5 is a block diagram of an example technology stack for implementing a single page application architecture.

The environments described in relation to FIGS. 2 through 4B, in some implementations, may use the following example technology stack 500 illustrated in FIG. 5 as part of the application architecture. For example, the technology stack 500 may be incorporated into the web app software stack 230 as described in relation to FIG. 2.

Beginning at the top of the technology stack 500, a package manager 502, in some embodiments, manages third party dependences in the project, including downloads and updates of software packages retrieved from third party systems. The package manager 502 may allow for modular design including incorporation of code developed outside the organization.

Beneath the package manager 502, a task manager 504, in some embodiments, is provided to execute steps of an automated build, using in-memory streams 506a to 506n to run tasks in parallel. The data streams 506a to 506n may allow for nodal connection of functionality, where information flows between modules of the automated build.

The task manager 504, in some embodiments, executes information developed using an underlying programming language 508, including a command line tool 510 incorporating a number of definition files 512. The programming language 508, in a particular example, may be TypeScript by Microsoft Corporation of Redmond, Wash. TypeScript is a superset of JavaScript with static typing and class-based object-oriented programming support.

A test support suite 514, in some implementations, supports real world testing of code developed to execute on a number of devices and/or platforms. The test suite 514, for example, can include unit test execution and/or end-to-end test execution without the use of an installed browser application (e.g., a "headless" browser test environment) for automated testing of GUI functionality. For example, runtime executable code such as Java code may be executed outside the browser construct by simulating user interactions with the browser-based executable. Tests may be run via command line execution options (e.g., for immediate testing and feedback) or using a batch testing environment (e.g., overnight testing or testing otherwise during down-times in the analytics ecosystem).

Beneath the test support suite 514 is a development support suite 516. The development support suite 516, for example, can include tools to ensure that all code follows a set of common coding conventions and includes project documentation. For example, the development support suite 516 can include a tool to perform static analysis of the software code to ensure that suspicious and/or non-portable constructs are flagged. Further, the development support suite 516 can include code compression to increase execution performance.

In some embodiments, a JS library 518 supports description of the graphical user interface as a function of state. Properties, in the form of immutable values 532, can be passed to a GUI component's renderer from the JS library 518 as properties in its HTML tag. The GUI component itself is denied the ability to directly modify these properties. Instead, properties are changeable using callback functions. Where a property is changed by a GUI component, the next state is issued to the GUI component responsive to this change. The JS library 518 may use a virtual Document Object Model (DOM) to examine state changes and apply the net difference to a state tree structure 520 of the particular GUI rendering document (e.g., HTML, XHTML, XML, etc.). The JS library 518 may create the state tree structure as an in-memory data structure cache for tracking state tree changes. Each node within the state tree 520, for example, represents a portion of the GUI rendering document. The JS library's 518 treatment of the GUI rendering document allows developers to code the GUI as if the entire interface is rendered on each change, while the JS library 518 effects rendering changes on a subcomponent basis.

The JS library 518, in some implementations, functions in tandem with a state function generator 522 that manages state and routing. The state function generator 522, for example, may receive the current state and the action requested by the GUI through the property modification callback function. The state function generator 522 may determine a new state for the GUI based upon this information. In other words, the state of the entire GUI application is stored within an object tree within a data store, and changes to state are determined as a function of the previous state and an action. The action is information provided by the GUI application through the callback function. Thus, the state function generator 522 manages navigation through state changes within the state tree 520.

To further prevent the mutation of application state, skipping down to the lowest level of the technology stack, persistent immutable data structures 530, in some embodiments, ensure that data is not changed once created. Instead, new updated data is created upon state changes. This allows for synchronized state changes that cannot be altered due to programming error.

Moving back up a layer of the technology stack 500, as a final component, in some embodiments a front-end web framework 524 provides an infrastructure for browser-agnostic and platform-agnostic mobile and desktop GUI application design. The front-end web framework 524 may include design templates 526 for centrally configuring UI components that are adaptable to the end user configuration. Further, the front-end web framework 524 may use JavaScript (JS) extensions 528 for simplifying design features.

The front-end web framework 524, in other words, supports responsive web design, allowing a developer to develop cross-platform UI code. The UI code developed through the front-end framework 524, for example, can be deployed to any popular web browser executing on any type of device such as desktop systems, tablet computers, and mobile smart phone devices while maintaining a consistent dependable user experience.

Figure 6:
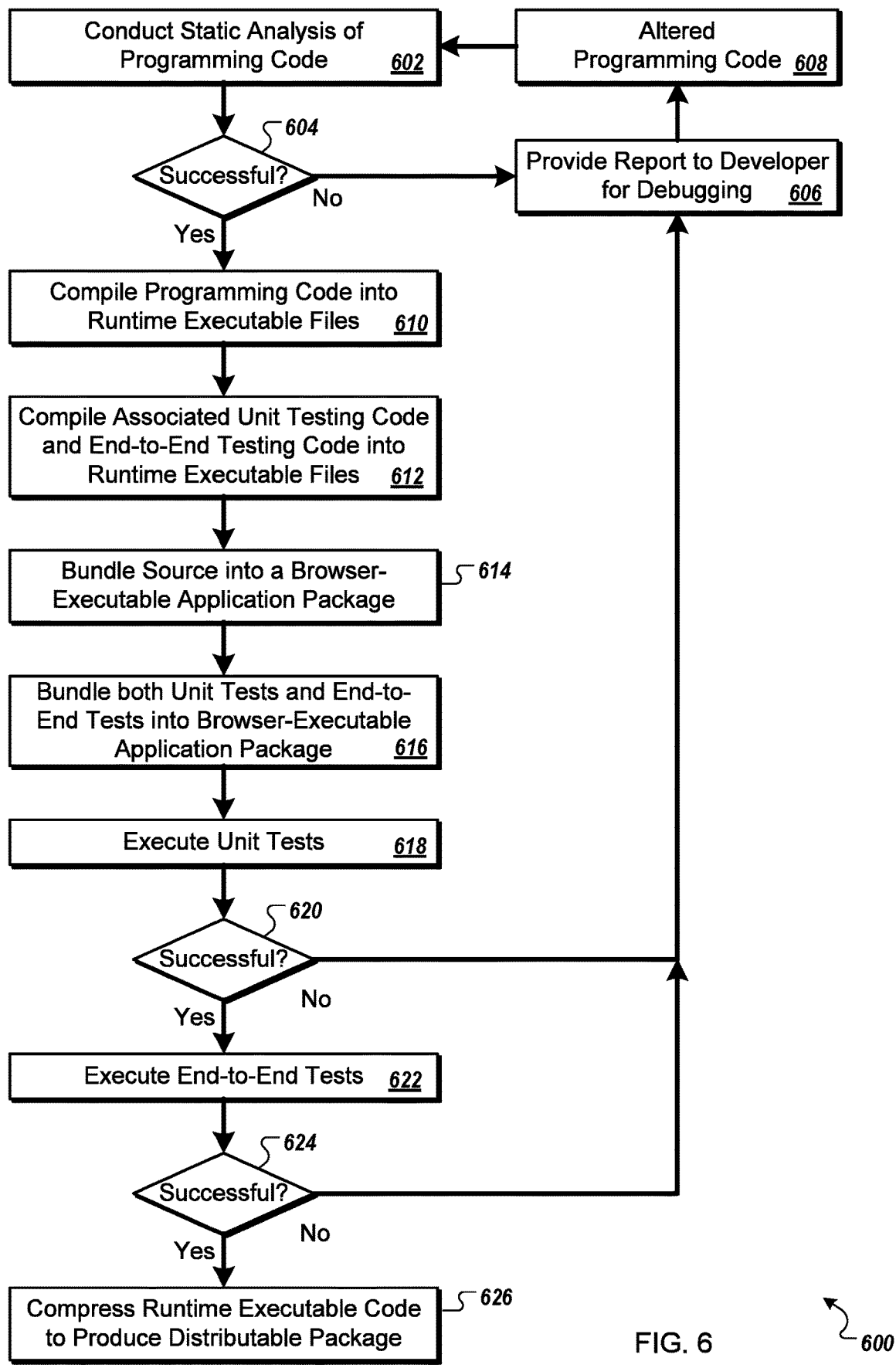
FIG. 6 is a flow chart of an example method for developing cross-platform user interface source code.

In some implementations, the task manager 504 of FIG. 5, in operation, supports a development workflow 600 illustrated in the flow chart of FIG. 6. The workflow 600, for example, may be defined as a series of tasks within the task manager 504 configuration file. As illustrated in FIG. 5, the task manager 504 executes tasks using data streams 506. Using data streams 506, one or more of the steps of the following workflow 600 may be performed in parallel. Further, some sub-tasks of individual steps of the workflow 600 may be executed in parallel by the task manager 504. As described in greater detail below, the task manager 504, in some embodiments, initiates the different stages of the development workflow 600 using differing layers of the technology stack 500 of FIG. 5.

Turning to FIG. 6, the development workflow 600, in some embodiments, begins at with analyzing developer source code to confirm that the code is following recommended coding conventions (602). For example, the development support suite of FIG. 5 may execute a static analysis tool to conduct static analysis of programming language (e.g., TypeScript) code files.

In some implementations, if the static analysis was not successful (604), a report output of the static analysis results is provided to the developer for debugging (606), and the developer supplies altered programming code to restart the workflow process (608).

Upon validating the source code (604), the development workflow 600, in some implementations, compiles the programming language files into runtime executable files, (610). The runtime executable files, for example, may be JavaScript files. The development support suite, for example, may include a compiler tool to convert the TypeScript code to JS files.

In some implementations, both the unit testing code and the end-to-end testing code is compiled into runtime executable files (612). For example, the unit testing code and the end-to-end testing code may be compiled into JavaScript files. The unit testing code and the end-to-end testing code, for example, may have been developed using the test support suite of FIG. 5. The test code compiler may be separate from the development compiler. For example, the test code compiler may be familiar with test suite declarations and test assertions established for executing the test code.

In some implementations, the compiled programming source is bundled into a browser-executable application package (614). The development support suite of FIG. 5, for example, may include a source bundling tool.

In some implementations, both the unit tests and the end-to-end tests are bundled into separate browser-executable application packages (616). As with the compiled programming source, a source bundling tool of the development support suite of FIG. 5 may bundle the unit tests and the end-to-end tests into separate browser-executable application packages.

The application package, the unit test package, and the end-to-end package, in some implementations, are now deployed for testing. First, unit tests are executed (618). The unit tests may be performed automatically as a test suite. Where one unit test fails, the tests may continue, optionally, on additional tests of the test suite. The unit tests, for example, may be executed using a "headless" browser for automated GUI testing. In another example, the testing environment may use a browser synchronization tool for testing the application in multiple device environments simultaneously. If the unit tests are not executed successfully (620), in some implementations, a report is provided to the developer for aid in debugging (606), and the developer may restart the workflow using altered programming code (608).

Once the unit tests have executed successfully (620), in some implementations, the end-to-end tests are executed (622). The end-to-end tests, for example, may be performed automatically as a test suite. The end-to-end tests may be executed using a "headless" browser for automated GUI testing. In another example, the testing environment may use a browser synchronization tool for performing end-to-end testing of the application in multiple device environments simultaneously.

If the end-to-end tests are not executed successfully (624), in some embodiments, a report is provided to the developer for aid in debugging (606), and the developer may restart the workflow using altered programming code (608).

Once the end-to-end tests have executed successfully (624), in some implementations, the runtime executable code is compressed to produce a distributable package (626). The package may now go into production, providing new user interface capabilities to end users. The capabilities of the distributable package are not linked to particular server-side technology, such as a .NET framework. Instead, the distributable package forms part of a unidirectional web architecture, where content is fed to the end user device from the server-side (e.g., cloud-based) web application framework, and the end user device supplies actions back to the web application framework. The web application framework can translate the actions into a new state (e.g., a request for updated content). This unidirectional web architecture is illustrated below in FIG. 7.

Figure 7:
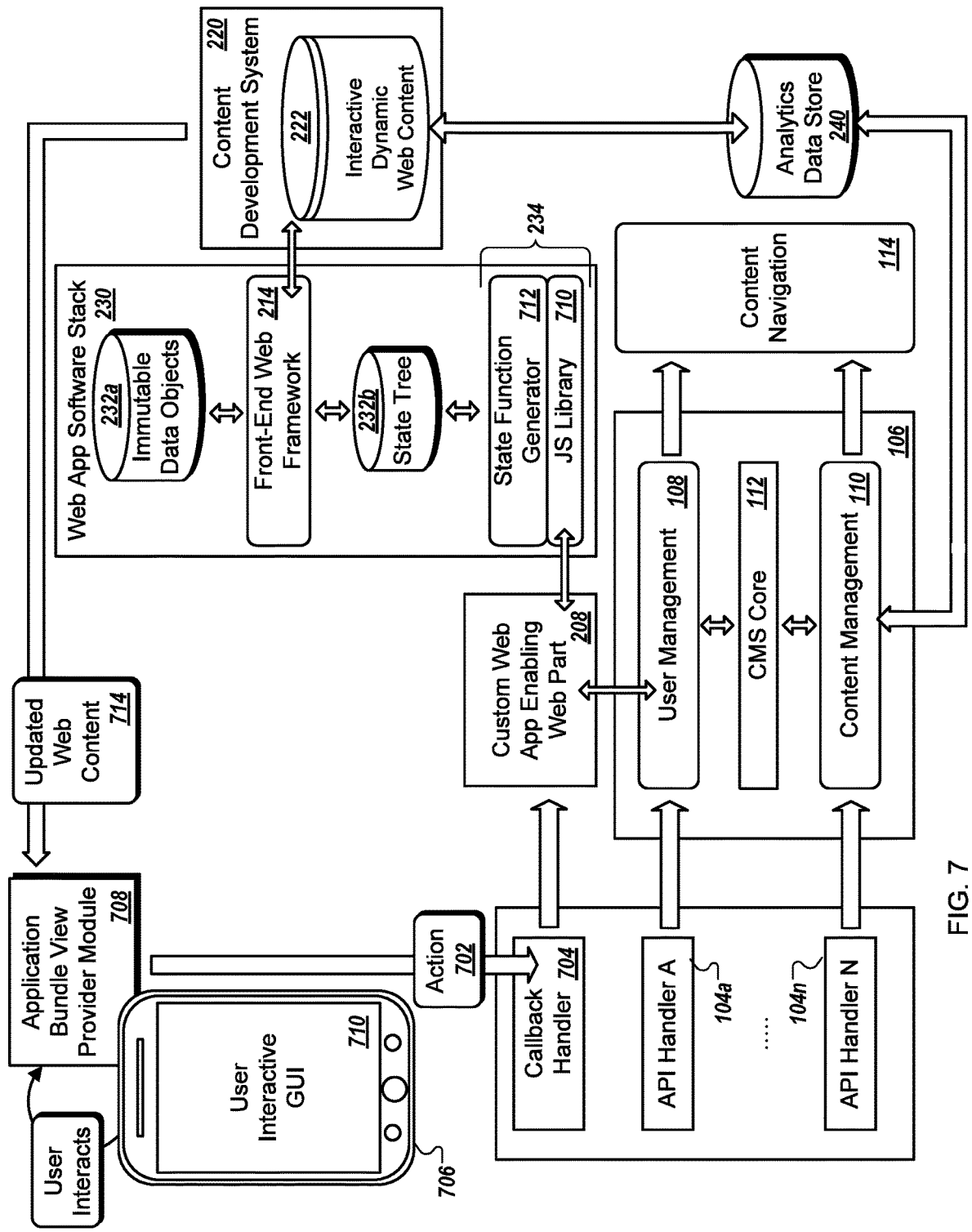
FIG. 7 is a block diagram of an example unidirectional web architecture.

Turning to FIG. 7, the architecture of FIG. 5 may be integrated into an extension of the content management system (CMS) 106 to provide interactive dynamic web content to an end user device through a static SPA with application-based state management. To incorporate the front-end web application framework 214 into the analytics environment and thus extend the ability of the CMS system 106, the CMS handlers 104a-104n can be extended to include a callback handler 704 for receiving actions 702 from a user device 706. The callback handler 704 may be created through modifications or extensions of preexisting handlers 104a-104n developed for interfacing with the CMS 106. The callback handler 704 is designed to communicate with the custom web part 208 which overrides default handling of the content navigation module 114 of the CMS 106. The custom web part 208, for example, may communicate actions 702, received from a view provider module 708 of the JS application bundle executing on the user device 706 to provide a dynamic interactive GUI 710 based upon a static SPA. The callback handler 704, for example, can be used to intercept actions 702 from the view provider module 708 on the user device 706 and provide the actions 702 to a JS library portion 710 of the web application software stack 230 for translation into a next application state.

In operation, the application bundle is provided to the user device 706 from the content development system 220. The view provider module 708 renders web-enabled content (e.g., HTML, XML, etc.) to the screen as the interactive GUI 710. As the user interacts with the GUI 710, the interaction (e.g., keyboard and/or mouse event) is translated by the view provider module 708 of the application bundle into the action 702 issued to the callback handler 704 through an application programming interface (API).

The callback handler 704 supplies the action 702 to the custom web application enabling web part 208. The action 702 is delivered to the JS library 710 of the web application software stack 230 by the custom web app enabling web part 208. Additionally, other extended operations can be performed at this time by the custom web app enabling web part 208, such as logging of the received action 702 or routing information.

In the web application software stack 230, the JS library 710 (e.g., similar to the JS Library 518 of FIG. 5) interfaces with a state function generator 712 (e.g., similar to the state function generator 522 of FIG. 5) to determine the current state of the user interactive GUI executing upon the user device. The current state, for example, may be based upon the contents of the state tree 232b (e.g., similar to the state tree 520 described in relation to FIG. 5). The state function generator 712 then applies the current state and the action 702 to a state change function to determine the next state. The next state may be associated with provision of additional interactive dynamic web content 714 (e.g., delivery of new data analytics information and/or other user interface content). The front-end web framework 214 instructs provision of the interactive dynamic web content 714 from the content development system 220 to the user device 706 responsive to the state change. The new state is stored as an immutable data object in the web application software stack 230 (e.g., as described in relation to immutable values 532 of FIG. 5).

Figure 8:
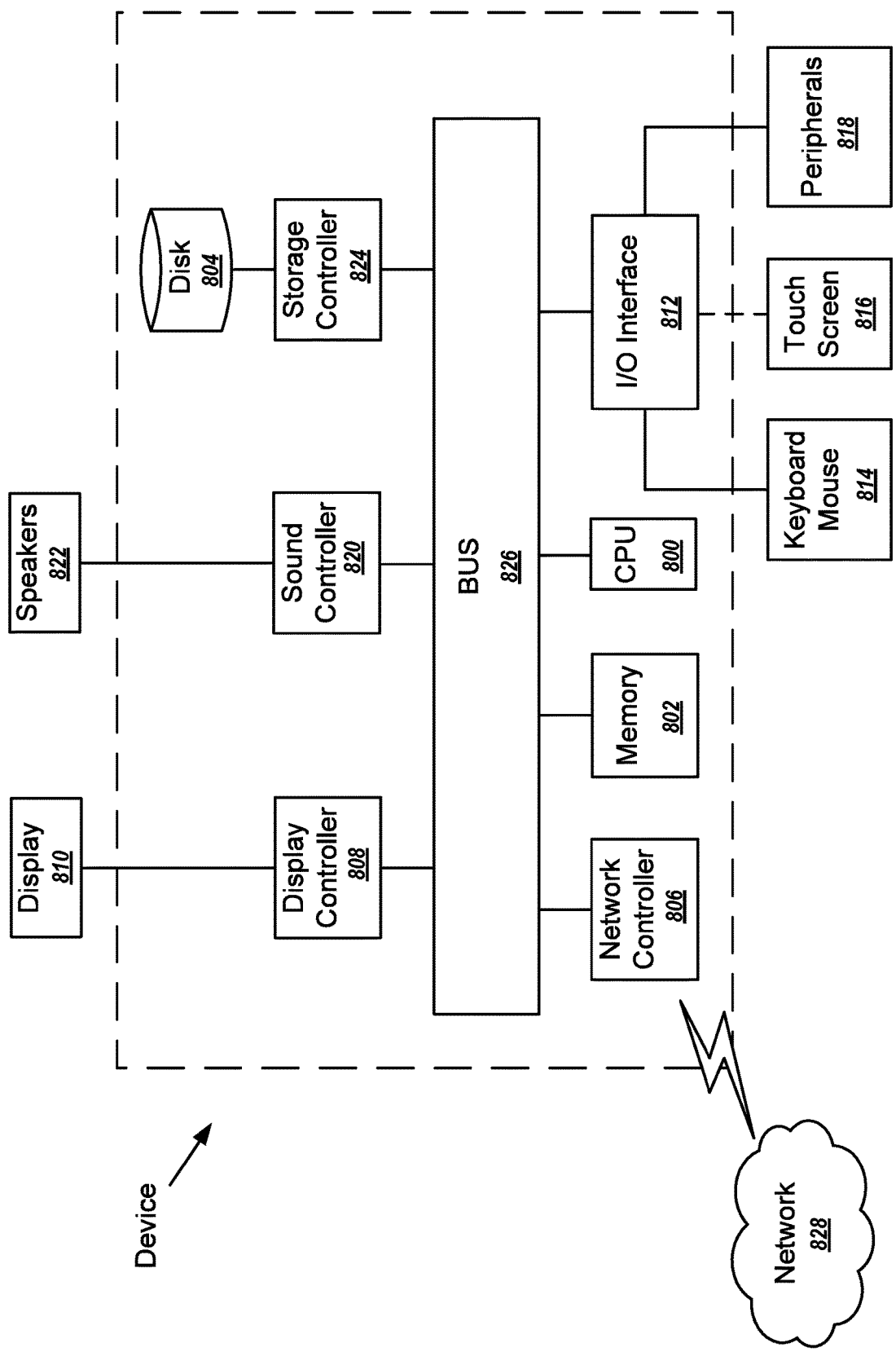
FIG. 8 is a block diagram of an example computing system.

Next, a hardware description of the computing device, mobile computing device, or server according to exemplary embodiments is described with reference to FIG. 8. In FIG. 8, the computing device, mobile computing device, or server includes a CPU 800 which performs the processes described above. The computing device 800, in some examples, may perform the operations of the content management system 106 or the content navigation system 114 of FIG. 1, the API handlers 204, the custom web app enabling web part 208, the web application software stack 230, and the content development system 220 of FIG. 2, the custom T & C acceptance web part 308 of FIG. 3, the settings persistence API 406 of FIG. 4A, the dashboard interactive dynamic web content 426 and user preference API 430 of FIG. 4B, the technology stack 500 of FIG. 5, and the application bundle view provider module 708 of FIG. 7. The process data and instructions may be stored in memory 802. These processes and instructions may also be stored on a storage medium disk 804 such as a hard drive (HDD) or portable storage medium or may be stored remotely. The memory 802 or storage medium disk 804, in some examples, may store the interactive dynamic web content 222, the database 232, and/or the analytics data store 240 of FIG. 2, the user database 408 of FIG. 4A, the state tree 520, design templates 526, JS extensions 528, and/or data objects as immutable values 532 of FIG. 5. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device, mobile computing device, or server communicates, such as a server or computer.

Further, a portion of the claimed advancements may be provided as a utility application, background daemon, or component of an operating system, or combination thereof, executing in conjunction with CPU 800 and an operating system such as Microsoft Windows 8, UNIX, Solaris, LINUX, Apple MAC-OS and other systems known to those skilled in the art.

CPU 800 may be a Xenon or Core processor from Intel of America or an Opteron processor from AMD of America, or may be other processor types that would be recognized by one of ordinary skill in the art. Alternatively, the CPU 800 may be implemented on an FPGA, ASIC, PLD or using discrete logic circuits, as one of ordinary skill in the art would recognize. Further, CPU 800 may be implemented as multiple processors cooperatively working in parallel to perform the instructions of the inventive processes described above. The processing circuitry of the CPU 800, for example, may perform the operations described in relation to the method 600 of FIG. 6, as well as portions of any of the operational flows of FIGS. 2, 3, 4A, 4B, 4C, and 7.

The computing device, mobile computing device, or server in FIG. 8 also includes a network controller 806, such as an Intel Ethernet PRO network interface card from Intel Corporation of America, for interfacing with network 828. As can be appreciated, the network 828 can be a public network, such as the Internet, or a private network such as an LAN or WAN network, or any combination thereof and can also include PSTN or ISDN sub-networks. The network 828 can also be wired, such as an Ethernet network, or can be wireless such as a cellular network including EDGE, 3G and 8G wireless cellular systems. The wireless network can also be Wi-Fi, Bluetooth, or any other wireless form of communication that is known. The network 828, for example, may provide communication between the web application software stack 230 and at least one of the custom web app enabling web part 208 and the content development system 220 of FIG. 2, the user device 404 and the content navigation module 114 of FIG. 4A, the CMS 106 and the user database 408 of FIG. 4A, the content development system 220 and the content management system 106 of FIG. 4A, and the user device 706 and the APIs 104 or callback handler 704 of FIG. 7.

The computing device, mobile computing device, or server further includes a display controller 808, such as a NVIDIA GeForce GTX or Quadro graphics adaptor from NVIDIA Corporation of America for interfacing with display 810, such as a Hewlett Packard HPL2445w LCD monitor. A general purpose I/O interface 812 interfaces with a keyboard and/or mouse 814 as well as a touch screen panel 816 on or separate from display 810. General purpose I/O interface also connects to a variety of peripherals 818 including printers and scanners, such as an OfficeJet or DeskJet from Hewlett Packard. The display controller 808 and display 810, for example, may enable the graphical user interfaces presented at the settings interface 404 of FIG. 4A, the dashboard interface 424 of FIG. 4B, and/or the user interactive graphical user interface 710 of FIG. 7.

A sound controller 820 is also provided in the computing device, mobile computing device, or server, such as Sound Blaster X-Fi Titanium from Creative, to interface with speakers/microphone 822 thereby providing sounds and/or music.

The general-purpose storage controller 824 connects the storage medium disk 804 with communication bus 826, which may be an ISA, EISA, VESA, PCI, or similar, for interconnecting all of the components of the computing device, mobile computing device, or server. A description of the general features and functionality of the display 810, keyboard and/or mouse 814, as well as the display controller 808, storage controller 824, network controller 806, sound controller 820, and general purpose I/O interface 812 is omitted herein for brevity as these features are known.

One or more processors can be utilized to implement various functions and/or algorithms described herein, unless explicitly stated otherwise. Additionally, any functions and/or algorithms described herein, unless explicitly stated otherwise, can be performed upon one or more virtual processors, for example on one or more physical computing systems such as a computer farm or a cloud drive.

Reference has been made to flowchart illustrations and block diagrams of methods, systems and computer program products according to implementations of this disclosure. Aspects thereof are implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

Figure 9:
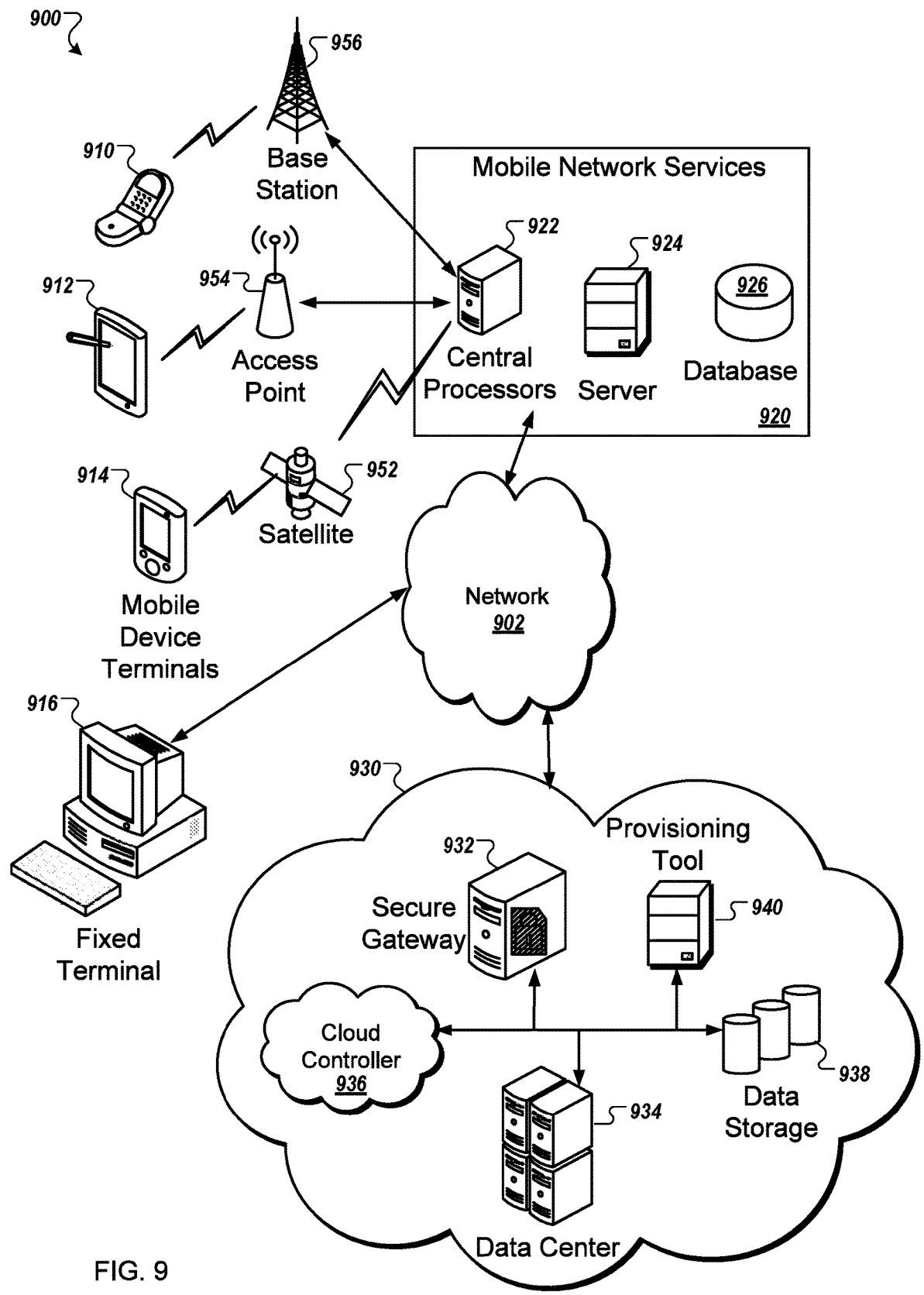
FIG. 9 is a block diagram of an example distributing computing environment including a cloud computing environment.

The functions and features described herein may also be executed by various distributed components of a system. For example, one or more processors may execute these system functions, wherein the processors are distributed across multiple components communicating in a network. The distributed components may include one or more client and server machines, which may share processing, as shown on FIG. 9, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

In some implementations, the described herein may interface with a cloud computing environment 930, such as Google Cloud Platform™ to perform at least portions of methods or algorithms detailed above. In some examples, cloud based applications can include performance of the content management system 106, the content development system 220, and the web application software stack 230. The processes associated with the methods described herein can be executed on a computation processor, such as the Google Compute Engine by data center 934. The data center 934, for example, can also include an application processor, such as the Google App Engine, that can be used as the interface with the systems described herein to receive data and output corresponding information. The cloud computing environment 930 may also include one or more databases 938 or other data storage, such as cloud storage and a query database. In some implementations, the cloud storage database 938, such as the Google Cloud Storage, may store processed and unprocessed data supplied by systems described herein. In some examples, the interactive dynamic web content 222, the database 232, and/or the analytics data store 240 of FIG. 2, the user database 408 of FIG. 4A, the state tree 520, the design templates 526, the JS extensions 528, and/or the data objects as immutable values 532 of FIG. 5 may be maintained within the cloud storage database 938.

The systems described herein may communicate with the cloud computing environment 930 through a secure gateway 932. In some implementations, the secure gateway 932 includes a database querying interface, such as the Google BigQuery platform.

The cloud computing environment 102 may include a provisioning tool 940 for resource management. The provisioning tool 940 may be connected to the computing devices of a data center 934 to facilitate the provision of computing resources of the data center 934. The provisioning tool 940 may receive a request for a computing resource via the secure gateway 932 or a cloud controller 936. The provisioning tool 940 may facilitate a connection to a particular computing device of the data center 934.

A network 902 represents one or more networks, such as the Internet, connecting the cloud environment 930 to a number of client devices such as, in some examples, a cellular telephone 910, a tablet computer 912, a mobile computing device 914, and a desktop computing device 916. The network 902 can also communicate via wireless networks using a variety of mobile network services 920 such as Wi-Fi, Bluetooth, cellular networks including EDGE, 3G and 4G wireless cellular systems, or any other wireless form of communication that is known. In some embodiments, the network 902 is agnostic to local interfaces and networks associated with the client devices to allow for integration of the local interfaces and networks configured to perform the processes described herein.

It must be noted that, as used in the specification and the appended claims, the singular forms "a," "an," and "the" include plural referents unless the context expressly dictates otherwise. That is, unless expressly specified otherwise, as used herein the words "a," "an," "the," and the like carry the meaning of "one or more." Additionally, it is to be understood that terms such as "left," "right," "top," "bottom," "front," "rear," "side," "height," "length," "width," "upper," "lower," "interior," "exterior," "inner," "outer," and the like that may be used herein merely describe points of reference and do not necessarily limit embodiments of the present disclosure to any particular orientation or configuration. Furthermore, terms such as "first," "second," "third," etc., merely identify one of a number of portions, components, steps, operations, functions, and/or points of reference as disclosed herein, and likewise do not necessarily limit embodiments of the present disclosure to any particular configuration or orientation.

Furthermore, the terms "approximately," "about," "proximate," "minor variation," and similar terms generally refer to ranges that include the identified value within a margin of 20%, 10% or preferably 5% in certain embodiments, and any values therebetween.

All of the functionalities described in connection with one embodiment are intended to be applicable to the additional embodiments described below except where expressly stated or where the feature or function is incompatible with the additional embodiments. For example, where a given feature or function is expressly described in connection with one embodiment but not expressly mentioned in connection with an alternative embodiment, it should be understood that the inventors intend that that feature or function may be deployed, utilized or implemented in connection with the alternative embodiment unless the feature or function is incompatible with the alternative embodiment.

While certain embodiments have been described, these embodiments have been presented by way of example only, and are not intended to limit the scope of the present disclosures. Indeed, the novel methods, apparatuses and systems described herein can be embodied in a variety of other forms; furthermore, various omissions, substitutions and changes in the form of the methods, apparatuses and systems described herein can be made without departing from the spirit of the present disclosures. The accompanying claims and their equivalents are intended to cover such forms or modifications as would fall within the scope and spirit of the present disclosures.

What is claimed is:

1. A method for integrating dynamic content from a content development platform with web content from a content management platform, the method comprising:

providing a web application framework comprising first instructions that, when executed on first processing circuitry, communicate information to the content development platform;

providing a web application enabling part comprising second instructions that, when executed on second processing circuitry,
communicate information to both the content management platform and the web application framework, and
alter web content generated by the content management platform;

providing, at an interface to the content management platform, an extended application programming interface (API) handler comprising third instructions that, when executed on third processing circuitry, intercept communications directed to the content management platform and redirect the communications to the web application enabling part, wherein
the web application enabling part is configured to override a portion of default handling of requests to the content management platform;
receiving, at the extended API handler, an action from a remote computing device;
providing, by the extended API handler to the web application enabling part, the action;
communicating, by the web application enabling part to the content management platform, information regarding the action, wherein
the content management platform generates, responsive to the information regarding the action, the web content;
providing, by the web application enabling part, the action to the web application framework;
responsive to receiving the action from the web application enabling part, interfacing, by the web application framework, with the content development platform to request dynamic content generated by the content management platform, wherein the content development platform generates, responsive to the request from the web application framework, the dynamic content;
receiving, by the web application enabling part from the web application framework, access information for accessing the dynamic content; and
injecting, by the web application enabling part, the access information into the web content to produce integrated dynamic content for review by a remote computing device, wherein
the access information is usable by the remote computing device to access the dynamic content from the content development system, and
after the injecting, the content management platform provides the web content to the remote computing device.

2. The method of claim 1, wherein:
the access information comprises a uniform resource identifier; and
accessing the dynamic content comprises following a uniform resource identifier to a source of the dynamic content.

3. The method of claim 1, further comprising:
providing a state function generator, comprising fourth instructions that, when executed on fourth processing circuitry, track state changes of an interactive user interface presented via dynamic content generated by the content development platform, wherein
the state function generator cooperates with the web application framework to track the state changes; and
responsive to the web application framework receiving the action from the web application enabling part, determining, by the state function generator, a current state of the interactive user interface presented via prior dynamic content;
wherein interfacing with the content development platform to request the dynamic content comprises providing, to the content development platform by the web application framework, the present state.

4. The method of claim 3, further comprising providing a web application software stack, wherein
the web application software stack comprises the web application framework and the state function generator.

5. The method of claim 3, wherein tracking the state changes comprises storing, by the web application framework, the present state as an immutable data object.

6. The method of claim 1, wherein the interactive content is a Single Page Application (SPA).

7. The method of claim 1, wherein:
the action is a login request; and
the second instructions of the web application enabling part, when executed by the second processing circuitry, supports acceptance of terms and conditions external from the content management system by
intercepting acceptance of terms and conditions from the remote computing device, and
interfacing with an authentication engine of the content management system to authenticate user access.

8. The method of claim 1, further comprising providing a data store accessible to both the content management system and the content development system, wherein
the dynamic content presents metrics derived from a plurality of data records maintained in the data store.

9. The method of claim 1, wherein the access information comprises metadata identifying a user token for enabling authenticated API calls to the content management system.

10. The method of claim 1, further comprising:
a view provider module executing upon the remote computing device and comprising fourth instructions that, when executed on fourth processing circuitry,
translate user interactions with the remote computing device into actions including the action, and
issue the actions to the extended API handler;
wherein the content development system provides the view provider module to the remote computing device.

* * * * *